(12) United States Patent  (10) Patent No.: US 9,131,200 B2
Chen et al.  (45) Date of Patent: Sep. 8, 2015

(54) WHITE BALANCE ADJUSTING METHOD WITH SCENE DETECTION AND DEVICE THEREOF

(71) Applicant: REALTEK SEMICONDUCTOR CORPORATION, Hsinchu (TW)

(72) Inventors: Shih-Tse Chen, Hsinchu County (TW); Ying-Liang Chou, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/069,132

(22) Filed: Oct. 31, 2013

(65) Prior Publication Data

US 2014/0192222 A1  Jul. 10, 2014

(30) Foreign Application Priority Data

Jan. 10, 2013 (TW) .............................. 102100946 A

(51) Int. Cl.
  *H04N 9/73* (2006.01)
  *H04N 5/235* (2006.01)
  *H04N 5/225* (2006.01)
  *G06T 7/40* (2006.01)

(52) U.S. Cl.
  CPC ............... *H04N 9/735* (2013.01); *G06T 7/408* (2013.01); *H04N 5/2254* (2013.01); *H04N 5/235* (2013.01); *H04N 5/2354* (2013.01)

(58) Field of Classification Search
  CPC ..... H04N 9/735; H04N 5/2354; H04N 5/235; H04N 5/2254
  USPC .................................. 348/223.1, 224.1, 225.1
  See application file for complete search history.

(56) References Cited

U.S. PATENT DOCUMENTS

| 6,301,440 B1* | 10/2001 | Bolle et al. ..................... 396/128 |
| 2004/0017594 A1* | 1/2004 | Suekane et al. ............... 358/516 |
| 2006/0038894 A1* | 2/2006 | Chan et al. ................. 348/222.1 |
| 2008/0143845 A1* | 6/2008 | Miki et al. ................. 348/223.1 |

(Continued)

FOREIGN PATENT DOCUMENTS

CN  102457665 A  5/2012

OTHER PUBLICATIONS

Office Action dated May 29, 2015 for counterpart China application No. 201310014714.3.

(Continued)

*Primary Examiner* — Roberto Velez
*Assistant Examiner* — Abdelaaziz Tissire
(74) *Attorney, Agent, or Firm* — WPAT, P.C.; Anthony King

(57) ABSTRACT

A white balance adjusting method with scene detection comprises: receiving source image data corresponding to a plurality of sensing units; generating an initial white balance gain according to the source image data; generating an image parameter corresponding to a plurality of parameter elements according to the source image data; determining whether a preset condition is satisfied according to the image parameter to generate a decision result; determining whether the source image data are associated with any of built-in scenes according to the decision result in which the built-in scenes include a first scene in connection with a first-scene adjustment rule; and if the source image data are associated with the first scene, adjusting the initial white balance gain or processing the source image data according to the first-scene adjustment rule to thereby obtain a scenic white balance gain and adjust the source image data with it.

16 Claims, 7 Drawing Sheets

(56) References Cited

U.S. PATENT DOCUMENTS

| | | | |
|---|---|---|---|
| 2010/0208098 A1* | 8/2010 | Ogawa | 348/223.1 |
| 2010/0208099 A1* | 8/2010 | Nomura | 348/223.1 |
| 2010/0231746 A1* | 9/2010 | Nomura | 348/223.1 |
| 2010/0290716 A1* | 11/2010 | Mori et al. | 382/309 |
| 2010/0295998 A1* | 11/2010 | Sakai et al. | 348/700 |
| 2011/0187892 A1* | 8/2011 | Takeuchi | 348/223.1 |
| 2012/0113272 A1 | 5/2012 | Hata | |

OTHER PUBLICATIONS

English abstract translation of the Office Action dated May 29, 2015 for counterpart China application No. 201310014714.3.
CN Publication No. CN102457665A is also published as US2012113272A1 (Published on May 10, 2012).

* cited by examiner

WHITE BALANCE ADJUSTING METHOD WITH SCENE DETECTION AND DEVICE THEREOF

BACKGROUND OF THE INVENTION

1. Field of the Invention

The present invention relates to a white balance adjusting method and the device thereof, especially to a white balance adjusting method with scene detection and the device thereof.

2. Description of Related Art

Regarding an image capture device (e.g. a digital camera), the raw image it captured will show different colors due to different environment color temperatures. For instance, if the capture target is a white wall, the raw image will appear in a warm color under a low environment color temperature (e.g. 1000K to 2800K), but in a cold color under a high environment color temperature (e.g. 8000K to 12200K). Therefore, said image capture device usually performs a white balance process to the raw image, so as to avoid or reduce the influence to the color display under different environment color temperatures. In other words, the white balance process is to make the color of the image of the same target under different environment temperatures remains similar or the same to thereby eliminate the phenomena of color shift.

As to the present arts, there are two major white balance processing methods. One is called "gray word"; the other one is called "white point detection". The theory of "gray word" is based on the assumption that an image normally includes a lot of colors. If an image randomly includes every kind of colors, the average of these colors should be gray theoretically. Accordingly, the algorithm of "gray word" is to sum up the colors of all sensing units in an image and calculate the average of the summation to obtain an average value, have a predetermined gray value divided by the average value to obtain a white balance gain if the average value is not equal to the gray value, and use the white balance gain to adjust the colors of all the sensing units in the image. However, said algorithm of "gray world" is only applicable to an image with full colors; if an image is mono-color or short of color variation (e.g. the image is a picture of sky or grassland), doing a white balance process with the "gray world" algorithm will cause color distortion to said image and lead to an unacceptable result (e.g. a sky image being dusky instead of blue, or a grassland image being gloomy instead of green).

On the other side, the theory of "white point detection" is to find out a plurality of sensing units whose color are similar to white in an image, sum up the colors of these sensing units and calculate the average of the summation to obtain an average value, have a predetermined white value divided by the average value to obtain a white balance gain if the average value is not equivalent to the white value, and use the white balance gain to adjust the colors of all the sensing units in the image. However, "white point detection" has its own problems. If the sensing units with colors similar to white are nowhere to be found in an image (e.g. an image of grass or sunset), doing a white balance process of "white point detection" will also cause color distortion to the image, and is incapable of restoring the correct or user-anticipated color of the image.

Since the two major white balance methods cannot restore the correct or user-anticipated color of an image related to a specific scene, the demand to improve white balance technique is still existed.

SUMMARY OF THE INVENTION

In light of the above, a purpose of the present invention is to provide a white balance adjusting method with scene detection and the device thereof to take care of the problems of the prior art.

The present invention discloses a white balance adjusting method with scene detection, which is carried out by a white balance adjusting device. According to an embodiment of this invention, the white balance adjusting method comprises: receiving source image data corresponding to a plurality of sensing units; generating an initial white balance gain according to the source image data; generating at least one image parameter corresponding to a plurality of parameter elements according to the source image data; determining whether at least one preset condition is satisfied according to the at least one image parameter, and thereby generating a decision result; determining whether the source image data are associated with any of built-in scenes according to the decision result and/or an association between the source image data and the built-in scenes in which the built-in scenes include a first scene in connection with a first-scene adjustment rule; and if the source image data are associated with the first scene, adjusting the initial white balance gain or processing the source image data according to the first-scene adjustment rule to thereby obtain a scenic white balance gain and adjust the source image data with the scenic white balance gain.

According to an embodiment of the present invention, the above-described white balance adjusting method can further comprise: acquiring at least one image capture parameter. Besides, the above-mentioned step of determining whether the source image data are associated with any of the built-in scenes and/or the association according to the decision result comprises: determining whether the source image data are associated with any of the built-in scenes and/or the association according to the image capture parameter and the decision result.

According to an embodiment of the present invention, the number of the aforementioned parameter elements is less than the number of the aforementioned sensing units. For instance, the number of the parameter elements is 1/K times the number of the sensing units in which the K is a positive multiple of 4 or a value to the power of 4.

According to an embodiment of the present invention, the aforementioned at least one image parameter includes at least one of a brightness parameter, a chrominance parameter and a texture parameter.

The present invention further discloses a white balance adjusting device with scene detection to carry out the white balance adjusting method and the equivalents thereof. According to an embodiment of this invention, the white balance adjusting device comprises: a data input interface to receive source image data from an image capture unit in which the source image data include a plurality of sensing units; a white balance calculating unit, coupled to the data input interface, to generate an initial white balance gain according to the source image data; an image parameter calculating unit, coupled to the data input interface, to generate at least one image parameter corresponding to a plurality of parameter elements according to the source image data; a decision unit, coupled to the image parameter calculating unit, to determine whether at least one preset condition is satisfied based on the at least one image parameter and accordingly generate a decision result; and a scene determining unit, coupled to the decision unit and the white balance calculating unit, to determine whether the source image data are associated to any of built-in scenes and/or an association between the source image data and the built-in scenes according to the decision result in which the built-in scenes include a first scene in connection with a first-scene adjustment rule, wherein if the source image data are associated with the first scene, adjusting the initial white balance gain or processing the source image data according to the first-scene adjustment rule to thereby obtain a scenic white balance gain and adjust the source image data with the scenic white balance gain.

According to an embodiment of the present invention, said scene determining unit further connects with the data input interface to acquire at least one image capture parameter therefrom, and then determines whether the source image data are associated with any of the built-in scenes and/or the association according to the image capture parameter and the decision result.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
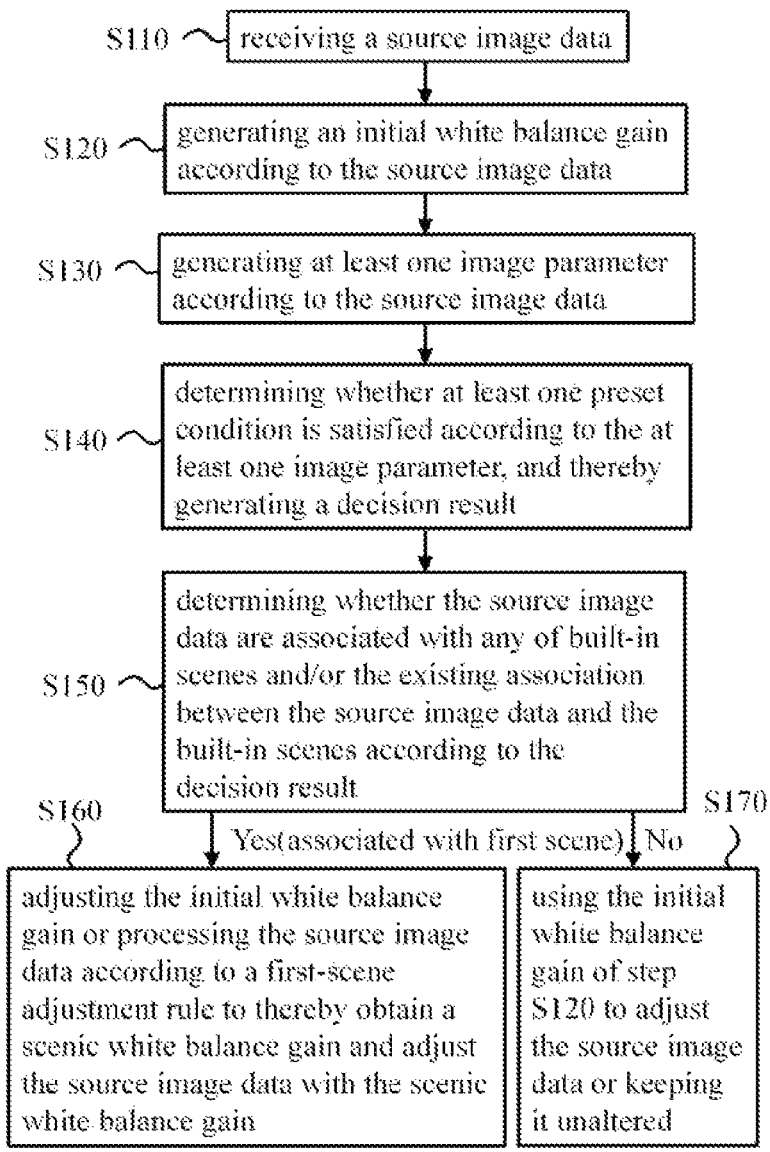
FIG. 1 illustrates an embodiment of the white balance adjusting method with scene detection of the present invention.

The following description uses language by referring to terms in the field of this invention. If any term is defined in the specification, such term should be explained accordingly. Besides, the connection between objects or events in the disclosed embodiments can be direct or indirect provided that these embodiments are still applicable under such connection. The mentioned "indirect" means that an intermediate object or a physical space is existed between the objects, or an intermediate event or a time interval is existed between the events. In addition, the following description relates to white balance adjustment, and thus the known detail in this filed will be omitted if such detail has little to do with the features of the present invention. Furthermore, the shape, size, and scale of any element and the step sequence of any flow chart in the disclosed figures are just exemplary for understanding, not for limiting the scope of this invention.

Besides, each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The present invention contains a white balance adjusting method with scene detection and the device thereof. Said method and device are capable of determining the scene of an image according to the source image data thereof, and performing white balance adjustment to the image according to the scene. The method and device of the present invention are applicable to an image capture device such as a digital camera; however, other image capture devices such as a cell phone and a digital video camera can adopt the present invention as well. Please note that although this specification gives sufficient embodiments, people of ordinary skill in the art can still choose components or steps equivalent to those described in this specification to carry out the present invention, which means that the scope of this invention is not limited to the embodiments in the specification. Besides, since the white balance adjusting method can be carried out by the device of the present invention or the equivalent devices thereof, the following description will abridge the hardware details related to the method provided that the remained disclosure is enough for understanding and enablement. Similarly, since some element by itself of the white balance adjusting device could be known, the detail of such element could be omitted provided that the omission nowhere dissatisfies the disclosure and enablement requirements.

Please refer to FIG. 1 which illustrates an embodiment of the white balance adjusting method with scene detection of the present invention. This embodiment is applicable to an image capture device (e.g. a digital camera); more specifically, it can be used to execute white balance adjustment for the image capture device. As shown in FIG. 1, the white balance adjusting method of the present embodiment comprises the following steps:

Step S110: receiving source image data which are corresponding to a plurality of sensing units. In this embodiment, the source image data are digital image data.

Step S120: generating an initial white balance gain according to the source image data. In this embodiment, the way to generate the initial white balance gain can be realized through a known "gray world" or "white point detection" algorithm; however, this example is for understanding, which means that other known white balance algorithms could be adopted in this step.

Step S130: generating at least one image parameter according to the source image data in which the at least one image parameter is corresponding to a plurality of parameter elements. In this embodiment, said at least one image parameter includes some or all of a brightness parameter, a chrominance parameter and a texture parameter; each of the parameters is corresponding to the plurality of parameter elements while the number of the parameter elements (e.g. a number of n×m in which the n and m are positive integers) is equal to or less than the number of the aforementioned sensing units (e.g. a number of (α×n)×(α×m) in which the a is a positive integer) of the source image data.

Step S140: determining whether at least one preset condition is satisfied according to the at least one image parameter, and thereby generating a decision result. In this embodiment, the content of the preset condition can be modified, increased and/or decreased.

Step S150: determining whether the source image data are associated with any of built-in scenes according to the decision result and/or determining an existing association between the source image data and the built-in scenes according to the decision result, wherein each of the built-in scenes is in connection with its own adjustment rule. For instance, the built-in scenes include a first scene in connection with a first-scene adjustment rule; said first scene could be a sky scene, a grassland scene, a sunset scene or any other scene. Consequently, if the first scene is a sky scene, the connected first-scene adjustment rule will be a sky scene adjustment rule; if the first scene is a grassland scene, the connected first-scene adjustment rule will be a grassland scene adjustment rule; and so on and so forth. Said first-scene adjustment rule can be a white balance adjustment value or a source image data selection and/or calculation rule.

Step S160: if step S150 determines that the source image data are associated with the first scene according to the decision result, adjusting the initial white balance gain or processing the source image data according to the first-scene adjustment rule to thereby obtain a scenic white balance gain and then adjust the source image data with the scenic white balance gain. For instance, if the source image data are associated with a sky scene, step S160 will rule out some or all of the sensing units of blue colors in the source image data according to a sky scene adjustment rule, then use the data of the rest sensing units to calculate the scenic white balance gain through any of known white balance algorithms, and adjust the source image data with the scenic white balance gain, so as to ensure the white balance adjustment accurate. In other words, the accuracy of the white balance adjustment is ensured by ruling out unnecessary data of blue colors. For another instance, if the source image data are associated with a grassland scene, step S160 may adjust the initial white balance gain with a grassland white balance adjustment value (e.g. having the gain of green colors of the initial white balance gain be multiplied by 1.2 (i.e. the grassland white balance adjustment value)) to get the scenic white balance gain and then adjust the source image data accordingly.

Please note that the aforementioned step S150 may find out the source image data corresponding to none of the built-in scenes according to the decision result. Therefore, as shown in FIG. 1, the present embodiment can further comprise a step S170 as described below:

Step S170: if step S150 determines that the source image data are associated with none of the built-in scenes according to the decision result, using the initial white balance gain of step S120 to adjust the source image data or keeping the source image data unaltered.

Based on the above description, in step S130, the number of the parameter elements can be set as 1/K times the number of the sensing units in which the K is a positive multiple of 4 or a value to the power of 4. For instance, if the source image data contain 1280×960 sensing units, the number of the parameter elements could be set as 320×240 or 80×60, which means that the number of the parameter elements is 1/16 or 1/256 times the number of the sensing units of the source image data. The reason to set the K as a positive multiple of 4 or a value to the power of 4 is in consideration of Bayer Pattern. Bayer Pattern is a technique widely applied in the image sensing field, which makes four sensing units in a square array retain the colors of Gr, R, Gb, B respectively to thereby constitute a basic unit of three primary colors (i.e. R, G, B). In another word, the present embodiment adopts a basic unit of three primary colors as the basis of the number of the parameter elements. However, since a basic unit of three primary colors may include a number of sensing units other than four (i.e. other than the sensing unit number of Bayer Pattern) such as only one sensing unit as illustrated by Foveon X3 sensor, therefore as long as an implementation is practicable, the relation between the number of the parameter elements and the number of the sensing units of the source image data is free to decide when carrying out the present invention.

Figure 2:
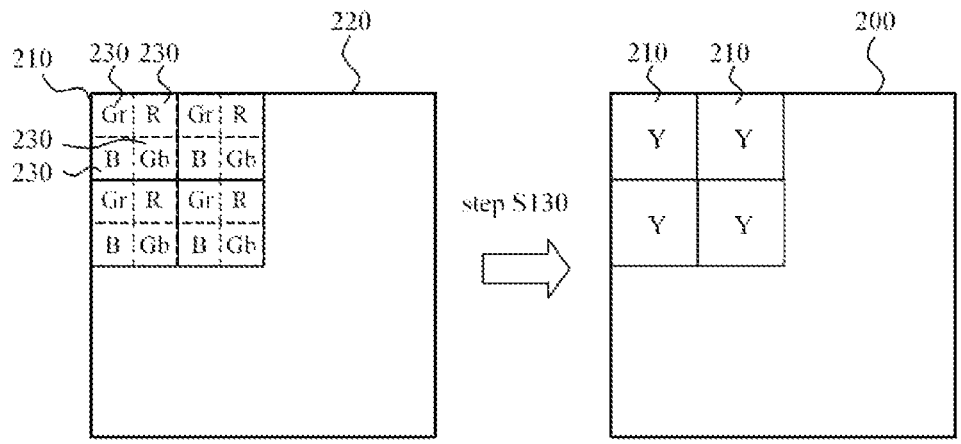
FIG. 2 illustrates an embodiment of generating a brightness parameter according to source image data.

Besides, as shown in FIG. 2, if the aforementioned image parameter is a brightness parameter 200 while one parameter element 210 is corresponding to four sensing units 230 in the source image data 220 (which means that the aforementioned value of K is 4), the brightness value (Y) of each parameter element 210 can be generated with the following equation: $Y=0.299 \times R+0.587 \times (Gr+Gb)/2+0.114 \times B$ (equation 1). The variables R, Gr, Gb, B in equation 1 represent the red, green, green, and blue colors retained in the four sensing units 230 of Bayer Pattern respectively. If one parameter element is corresponding to eight or sixteen sensing units (which means that the value of K is 8 or 16), the average of each color in these sensing units is being substituted for the variables R, Gr, Gb, B in equation 1 respectively to thereby obtain the brightness value (Y) of said parameter element. More derivation with other values of K could be realized through the above disclosure by those of ordinary skill in the art, and is thus omitted here. Please note that if a single sensing unit constitutes a basic unit of three primary colors, the variables Gr, Gb of equation 1 can be replaced by the green value retained in the single sensing unit for the calculation of Y.

Figure 3:
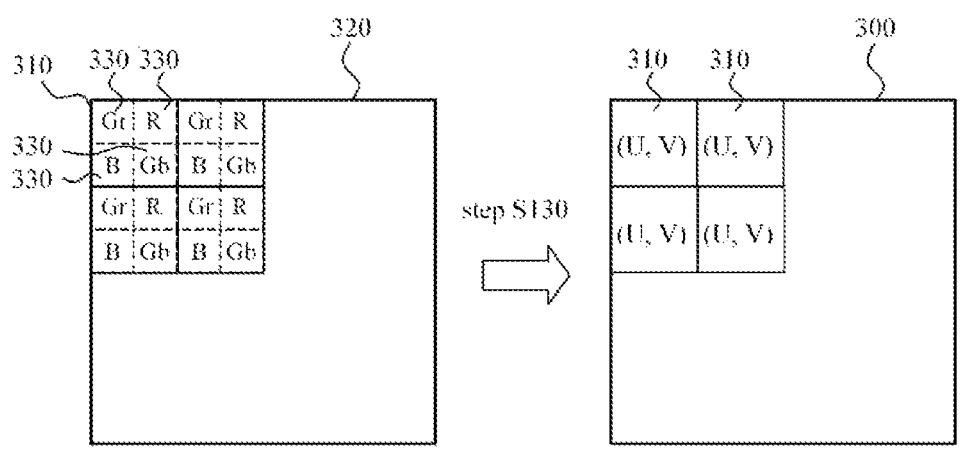
FIG. 3 illustrates an embodiment of generating a chrominance parameter according to source image data.

Furthermore, as shown in FIG. 3, if the aforementioned image parameter is a chrominance parameter 300 while one parameter element 310 is corresponding to four sensing units 330 in the source image data 320 (which means that the value of K is 4), the chrominance value (including a hue value U and a depth value V) of each parameter element 310 can be generated with the following equations: $U=0.14713 \times R-0.28886 \times (Gr+Gb)/2+0.436 \times B$ (equation 2); $V=0.615 \times R-0.51499 \times (Gr+Gb)/2-0.10001 \times B$ (equation 3). Similarly, the variables R, Gr, Gb, B in equations 2 and 3 are the red, green, green, and blue colors retained in the four sensing units 330 of Bayer Pattern respectively. As to the calculation related to another value of K, it can be derived by referring to the calculation of brightness values (Y). Please note that in a UV plane (where the x-axis stands for U and the y-axis stands for V), if the U value and V value of a parameter element fall within the area of a predetermined color (e.g. blue) in the UV plane, the present embodiment will deem that the color of the parameter element conforms to the predetermined color. Accordingly, by defining areas of different predetermined colors, this embodiment can make statistics on the color distribution of the parameter elements for the following use.

Figure 4:
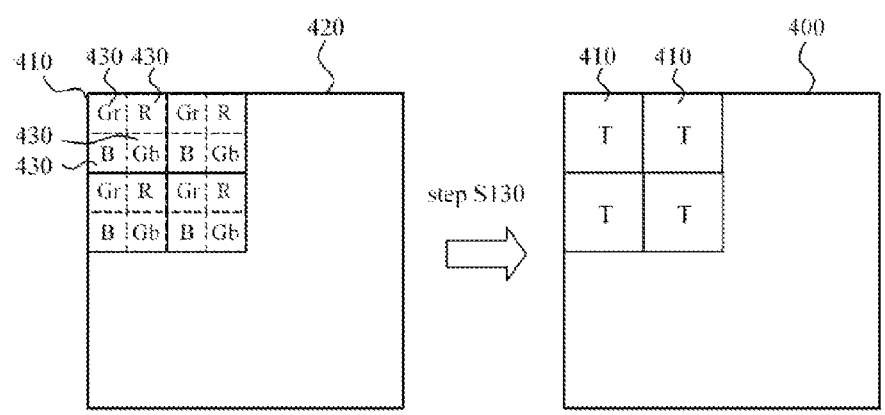
FIG. 4 illustrates an embodiment of generating a texture parameter according to source image data.

Moreover, as shown in FIG. 4, if the aforementioned image parameter is a texture parameter 400 and the number of its parameter elements is n×m, the texture value (T) of each parameter element can be derived from the following equation: $T=G_{i+1,j}-G_{i,j}$ (equation 4), wherein the suffix i is a number between 1 and n−1, the suffix j is a number between 1 and m, and the variable G is the average or weighted average of green values Gr, Gb stored in the sensing units 430 of Bayer Pattern in the source image data 420; in this case, the ratio of the sensing unit number to the parameter element number (i.e. the value of K) is four.

Please note that the above-mentioned equation 1 to equation 4 are exemplary, not unalterable. People of ordinary skill in the art can use other equations to calculate the brightness value, the chrominance value and the texture value, or modify the coefficients of equations 1~4 on their own demand or design rules. To be straight, equations 1~4 are for understanding, not for limiting the present invention.

Figure 5:
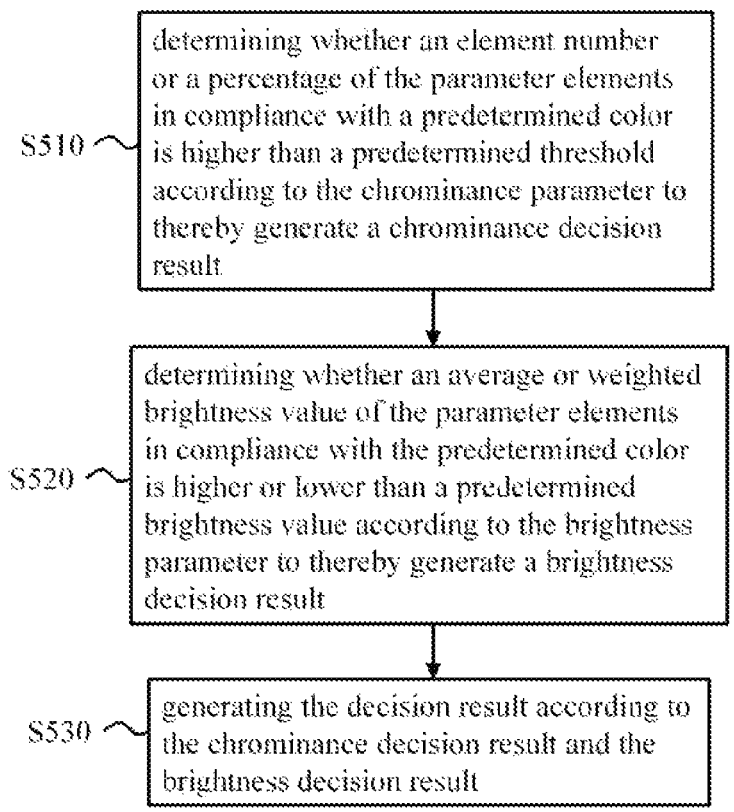
FIG. 5 illustrates an embodiment of step S140 of FIG. 1.

Please refer to FIG. 1 and the description thereof. In step S140, the at least one preset condition includes a first scene condition (e.g. a sky scene condition), a second scene condition (e.g. a grassland scene condition) and a third scene condition (e.g. a sunset scene condition). As shown in FIG. 5, when determining whether the first scene condition is satisfied according to the at least one image parameter, step S140 can include the following steps:

Step S510: determining whether an element number or a percentage of the parameter elements in compliance with a predetermined color is higher than a predetermined threshold according to the aforementioned chrominance parameter to thereby generate a chrominance decision result. For instance, if the first scene condition relates to a sky scene, said predetermined color will be blue; and step S510 will determine whether the percentage of the parameter elements in compliance with blue color is higher than the predetermined threshold (e.g. 1/4).

Step S520: determining whether an average or weighted brightness value of the parameter elements in compliance with the predetermined color is higher or lower than a predetermined brightness value according to the aforementioned brightness parameter to thereby generate a brightness decision result. For instance, if the first scene condition relates to the sky scene, step S520 will determine whether the average brightness value of the parameter elements of blue color is higher than the predetermined brightness value (e.g. 120).

Step S530: generating the decision result according to the chrominance decision result and the brightness decision result. For instance, if the chrominance decision result indicates that the ratio of the parameter elements of blue color to the total parameter elements is higher than the predetermined threshold and the average brightness value is higher than the predetermined brightness value, step S530 will determine that the sky scene condition is satisfied and then generate the decision result.

Based on the above description, since the parameter elements in compliance with a predetermined color may congregate in a certain area of the image related to a specific scene, step S510 can further includes: determining whether a centralization percentage of the parameter elements of the predetermined color lying within a predetermined area is higher than a predetermined percentage to thereby generate the chrominance decision result. For instance, if the aforementioned first scene condition relates to the sky scene, seeing that the sky usually appears at the top of a picture, the present step can determine whether a centralization percentage of the parameter elements of blue color lying within the upper half area (i.e. said predetermined area) of the source image data is higher than a predetermined percentage (e.g. 1/2), so as to realize whether the source image data implied a sky scene and thereby generate the chrominance decision result. Please note that the scope of the predetermined area can be well set by those of ordinary skill in the art with their demand, experience or design rules.

Figure 6:
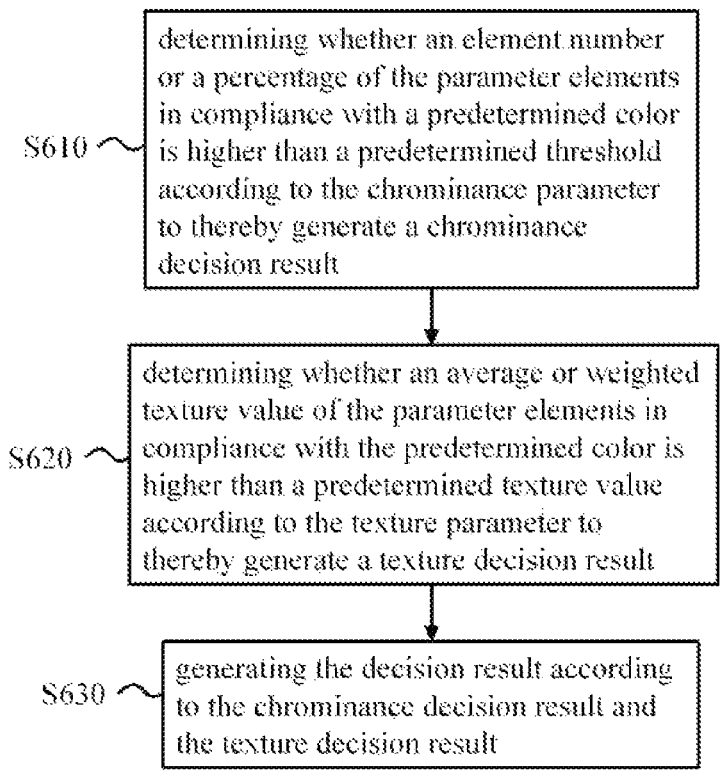
FIG. 6 illustrates another embodiment of step S140 of FIG. 1.

Please refer to FIG. 1 and the description thereof again, and refer to FIG. 6 at the same time. When determining whether the aforementioned second scene condition (e.g. a grassland scene condition) is satisfied according to the at least one image parameter, step S140 can comprise the following steps:

Step S610: determining whether an element number or a percentage of the parameter elements in compliance with a predetermined color is higher than a predetermined threshold according to the aforementioned chrominance parameter to thereby generate a chrominance decision result. For instance, if the second scene condition relates to a grassland scene, said predetermined color will be green; and step S610 will determine whether the percentage of the parameter elements in compliance with green color is higher than the predetermined threshold (e.g. 2/3).

Step S620: determining whether an average or weighted texture value of the parameter elements in compliance with the predetermined color is higher than a predetermined texture value according to the aforementioned texture parameter to thereby generate a texture decision result. For instance, if the second scene condition relates to the grassland scene, step S620 will determine whether the average texture value of the parameter elements of green color is higher than the predetermined texture value (e.g. 800).

Step S630: generating the decision result according to the chrominance decision result and the texture decision result. For instance, if the chrominance decision result indicates that the ratio of the parameter elements of green color to the total parameter elements is higher than the predetermined threshold and the average texture value is higher than the predetermined texture value, step S630 will determine that the grassland scene condition is satisfied and then generate the decision result.

Figure 7:
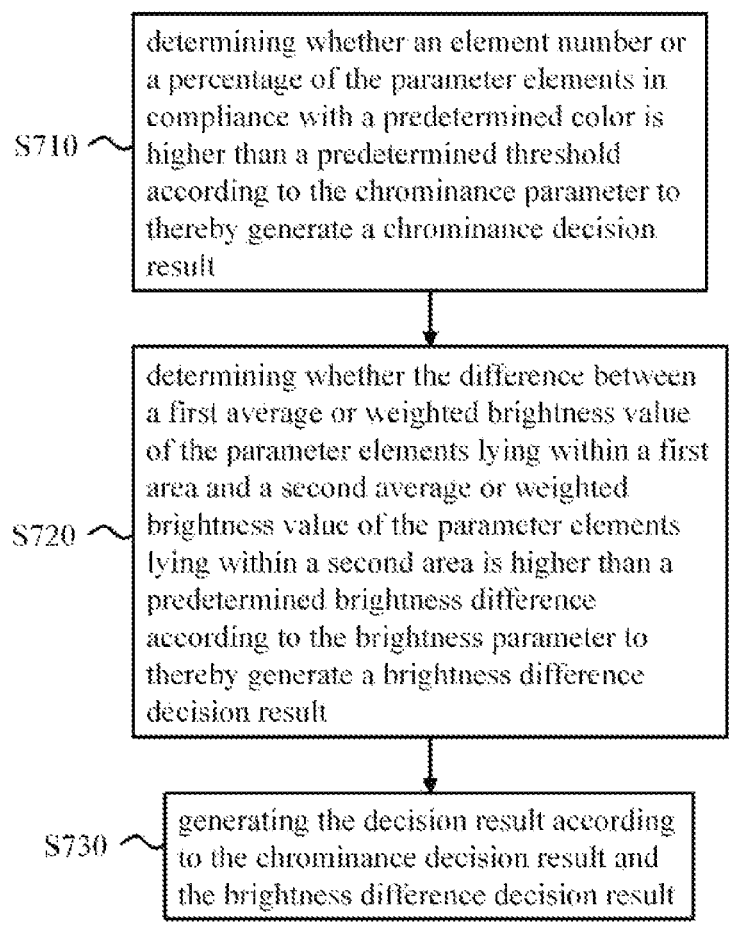
FIG. 7 illustrates yet another embodiment of step S140 of FIG. 1.

Please refer to FIG. 1 and the description thereof once more, and refer to FIG. 7 at the same time. When determining whether the aforementioned third scene condition (e.g. a sunset scene condition) is satisfied according to the at least one image parameter, step S140 can comprise the following steps:

Step S710: determining whether an element number or a percentage of the parameter elements in compliance with a predetermined color is higher than a predetermined threshold according to the aforementioned chrominance parameter to thereby generate a chrominance decision result. For instance, if the third scene condition relates to a sunset scene, said predetermined color will be yellow; and step S710 will determine whether the percentage of the parameter elements in compliance with yellow color is higher than the predetermined threshold (e.g. 1/3).

Step S720: determining whether the difference between a first average or weighted brightness value of the parameter elements lying within a first area and a second average or weighted brightness value of the parameter elements lying within a second area is higher than a predetermined brightness difference according to the brightness parameter to thereby generate a brightness difference decision result. For instance, if the third scene condition relates to the sunset scene, step S720 will determine whether the difference between the average brightness values of the upper half and lower half of the source image data is higher than the predetermined brightness difference (e.g. 60).

Step S730: generating the decision result according to the chrominance decision result and the brightness difference decision result. For instance, if the chrominance decision result indicates that the ratio of the parameter elements of yellow color to the total parameter elements is higher than the predetermined threshold and the difference between the average brightness values of the upper and lower halves is higher than the predetermined brightness difference, step S730 will determine that the sunset scene condition is satisfied and then generate the decision result.

Please note that the alleged concrete values of the predetermined threshold, predetermined brightness value, predetermined percentage, predetermined texture value and predetermined brightness difference are merely for understanding, not for limiting the present invention. In fact, people of ordinary skill in the art can set or modify those values in light the disclosure in this specification and their own demand or design rules. Please also note that the steps of any of the embodiments are not restricted by any specific execution sequence unless such sequence is asserted or suggested.

Please refer to FIG. 1 and the description thereof one more time. Since the image capture parameter of the aforementioned image capture unit may affect the white balance adjustment, in another embodiment of the present invention, the method of FIG. 1 can further comprise: acquiring at least one image capture parameter. In this case, step S150 of FIG. 1 will include: determining whether the source image data are associated with any of the built-in scenes and/or the association according to the image capture parameter and the decision result. Said image capture parameter may include an exposure time parameter and/or an exposure gain parameter; consequently, step S150 may include: generating a product of the exposure time parameter and the exposure gain parameter; and determining whether the source image data are associated with any of the built-in scenes and/or the association according to the product and the decision result. For instance, if the decision result of step S140 indicates that a sky scene condition is satisfied, step S150 not only determines the scene according to the decision result, but also determines whether the source image data are associated with a sky scene in accordance with whether the product of the exposure time parameter and exposure gain parameter is less than a predetermined exposure value (e.g. 20). To be more specific, only if the product is less than the predetermined exposure value is step S150 allowed to determine the source image data corresponding to the sky scene.

In addition to the fore-disclosed embodiments, the present invention further discloses a white balance adjusting device with scene detection to carry out the white balance adjusting method of this invention and the equivalents thereof. An embodiment of the white balance adjusting device 800 is illustrated by FIG. 8, comprising: a data input interface 810 to receive source image data from an image capture unit (not shown) in which the source image data include a plurality of sensing units; a white balance calculating unit 820 (e.g. a microprocessor), coupled to the data input interface 810, to generate an initial white balance gain according to the source image data; an image parameter calculating unit 830 (e.g. a microprocessor), coupled to the data input interface 810, to generate at least one image parameter corresponding to a plurality of parameter elements according to the source image data; a decision unit 840 (e.g. a circuit composed of comparators and logic gates), coupled to the image parameter calculating unit 830, to determine whether at least one preset condition is satisfied based on the at least one image parameter and accordingly generate a decision result; and a scene determining unit 850 (e.g. a circuit composed of comparators and logic gates or a circuit of look-up table), coupled to the decision unit 840 and the white balance calculating unit 820, to determine whether the source image data are associated to any of built-in scenes and/or an existing association between the source image data and the built-in scenes according to the decision result in which the built-in scenes include a first scene in connection with a first-scene adjustment rule, wherein if the scene determining unit 850 indicates that the source image data are associated with the first scene, the white balance calculating unit 820 will adjust the initial white balance gain or processing the source image data according to the first-scene adjustment rule to thereby generate a scenic white balance gain, then adjust the source image data with the scenic white balance gain, and thereby generate white balance data of scene detection.

In the present embodiment, the number of parameter elements can be 1/K times the number of the sensing units, which has been mentioned in the description of the white balance adjusting method. Said K could be a positive multiple of 4 or a value to the power of 4; however, this is exemplary, not a limitation to this invention. Besides, the at least one image parameter may include some or all of a brightness parameter, a chrominance parameter and a texture parameter, and the derivation and utilization of these parameters has been well-explained in the embodiments of the fore-disclosed method invention. Furthermore, the decision unit 840 can execute the steps of FIG. 5, FIG. 6 and/or FIG. 7; since these steps can be done through common comparison and logic circuits (e.g. comparators, AND gate, and/or OR gate), which means that people of ordinary skill in the art can use known circuits to implement the decision unit 840 based on the disclosure of the present invention, redundant illustration is therefore omitted. Moreover, the scene determining unit 850 can further connect to the data input interface 810 to acquire at least one image capture parameter from the mentioned image capture unit, and thereby determines whether the source image data are associated to any of built-in scenes and/or the existing association according to the decision result and the image capture parameter. Similarly, people of ordinary skill in the art can use known comparators and logic circuits to implement the scene determining unit 850 in accordance with the disclosure of the present invention, and hence unnecessary illustration is abridged.

Figure 8:
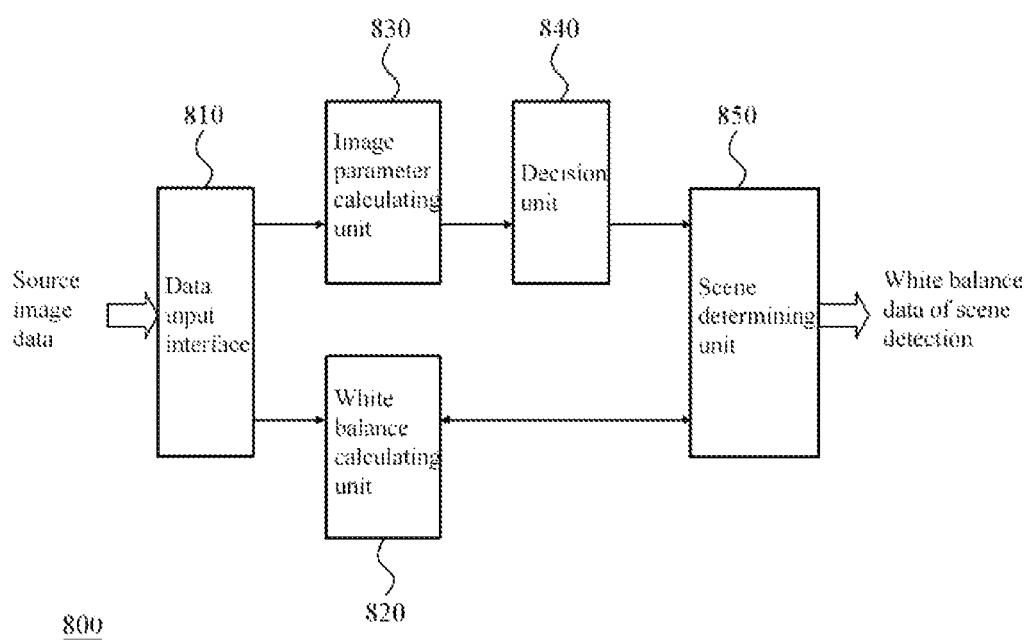
FIG. 8 illustrates an embodiment of the white balance adjusting device with scene detection of the present invention.

Please note that since people of ordinary skill in the art can fully understand the white balance adjusting device 800 of FIG. 8 and implement components therein through referring to the fore-described method invention, redundant and unnecessary description is therefore omitted here. Please also note that the terms "first", "second", "third" and the like in this specification are only for distinction, which means that such terms should not bring any restriction to the present invention.

To sum up, the white balance adjusting method and device with scene detection of the present invention are capable of determining whether source image data are associated to a built-in scene, and doing white balance compensation to the source image data if an association is found or verified, so that the present invention can restore the relatively correct or user-anticipated color of the source image data and avoid color distortion caused by improper white balance compensation of the prior art. In short, the present invention improves the prior art by scene detection and brings back vivid image to sight.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. A white balance adjusting method with scene detection carried out by a white balance adjusting device, comprising:
   receiving source image data corresponding to a plurality of sensing units;
   generating an initial white balance gain according to the source image data;
   generating at least one image parameter corresponding to a plurality of parameter elements according to the source image data, wherein the at least one image parameter includes at least one of a brightness parameter, a chrominance parameter and a texture parameter;
   determining whether at least one preset condition is satisfied according to the at least one image parameter, and thereby generating a decision result, wherein the step of generating the decision result includes:

determining whether an element number or a percentage of the parameter elements in compliance with a predetermined color is higher than a predetermined threshold according to the chrominance parameter to thereby generate a chrominance decision result;

determining whether an average or weighted brightness value of the parameter elements in compliance with the predetermined color is higher or lower than a predetermined brightness value according to the brightness parameter to thereby generate a brightness decision result; and generating the decision result according to the chrominance decision result and the brightness decision result;

determining whether the source image data are associated with any of built-in scenes and/or an association between the source image data and the built-in scenes according to the decision result in which the built-in scenes include a first scene in connection with a first-scene adjustment rule; and if the source image data are associated with the first scene, adjusting the initial white balance gain or processing the source image data according to the first-scene adjustment rule to thereby obtain a scenic white balance gain and adjust the source image data with the scenic white balance gain.

2. The white balance adjusting method with scene detection of claim 1, further comprising:
acquiring at least one image capture parameter,
wherein the step of determining whether the source image data are associated with any of the built-in scenes and/or the association includes: determining whether the source image data are associated with any of the built-in scenes and/or the association according to the image capture parameter and the decision result.

3. The white balance adjusting method with scene detection of claim 2, wherein the image capture parameter includes an exposure time parameter and/or an exposure gain parameter.

4. The white balance adjusting method with scene detection of claim 1, wherein the number of the parameter elements is less than the number of the sensing units.

5. The white balance adjusting method with scene detection of claim 4, wherein the number of the parameter elements is 1/K times the number of the sensing units in which the K is a positive multiple of 4 or a value to the power of 4.

6. The white balance adjusting method with scene detection of claim 1, wherein the step of generating the chrominance decision result further includes:
determining whether a centralization percentage of the parameter elements of the predetermined color lying within a predetermined area is higher than a predetermined percentage to thereby generate the chrominance decision result.

7. The white balance adjusting method with scene detection of claim 1, further comprising:
if the source image data are associated to none of the built-in scenes, adjusting the source image data with the initial white balance gain.

8. A white balance adjusting method with scene detection carried out by a white balance adjusting device, comprising:
receiving source image data corresponding to a plurality of sensing units; generating an initial white balance gain according to the source image data;
generating at least one image parameter corresponding to a plurality of parameter elements according to the source image data, wherein the image capture parameter includes an exposure time parameter and/or an exposure gain parameter;

determining whether at least one preset condition is satisfied according to the at least one image parameter, and thereby generating a decision result;

determining whether the source image data are associated with any of built-in scenes and/or an association between the source image data and the built-in scenes according to the decision result in which the built-in scenes include a first scene in connection with a first-scene adjustment rule, wherein the step of determining whether the source image data are associated any of the built-in scenes and/or the association according to the image capture parameter and the decision result includes:
generating a product of the exposure time parameter and the exposure gain parameter; and
determining whether the source image data are associated with any of the built-in scenes and/or the association according to the product and the decision result; and if the source image data are associated with the first scene, adjusting the initial white balance gain or processing the source image data according to the first-scene adjustment rule to thereby obtain a scenic white balance gain and adjust the source image data with the scenic white balance gain.

9. A white balance adjusting method with scene detection carried out by a white balance adjusting device, comprising:
receiving source image data corresponding to a plurality of sensing units;
generating an initial white balance gain according to the source image data;
generating at least one image parameter corresponding to a plurality of parameter elements according to the source image data, wherein the at least one image parameter includes at least one of a brightness parameter, a chrominance parameter and a texture parameter;
determining whether at least one preset condition is satisfied according to the at least one image parameter, and thereby generating a decision result, wherein the step of generating the decision result includes:
determining whether an element number or a percentage of the parameter elements in compliance with a predetermined color is higher than a predetermined threshold according to the chrominance parameter to thereby generate a chrominance decision result;
determining whether an average or weighted texture value of the parameter elements in compliance with the predetermined color is higher than a predetermined texture value according to the texture parameter to thereby generate a texture decision result; and
generating the decision result according to the chrominance decision result and the texture decision result;
determining whether the source image data are associated with any of built-in scenes and/or an association between the source image data and the built-in scenes according to the decision result in which the built-in scenes include a first scene in connection with a first-scene adjustment rule; and
if the source image data are associated with the first scene, adjusting the initial white balance gain or processing the source image data according to the first-scene adjustment rule to thereby obtain a scenic white balance gain and adjust the source image data with the scenic white balance gain.

10. A white balance adjusting method with scene detection carried out by a white balance adjusting device, comprising:
- receiving source image data corresponding to a plurality of sensing units;
- generating an initial white balance gain according to the source image data;
- generating at least one image parameter corresponding to a plurality of parameter elements according to the source image data, wherein the at least one image parameter includes at least one of a brightness parameter, a chrominance parameter and a texture parameter;
- determining whether at least one preset condition is satisfied according to the at least one image parameter, and thereby generating a decision result, wherein the step of generating the decision result includes:
  - determining whether an element number or a percentage of the parameter elements in compliance with a predetermined color is higher than a predetermined threshold according to the chrominance parameter to thereby generate a chrominance decision result;
  - determining whether the difference between a first average or weighted brightness value of the parameter elements lying within a first area and a second average or weighted brightness value of the parameter elements lying within a second area is higher than a predetermined brightness difference according to the brightness parameter to thereby generate a brightness difference decision result; and
  - generating the decision result according to the chrominance decision result and the brightness difference decision result;
- determining whether the source image data are associated with any of built-in scenes and/or an association between the source image data and the built-in scenes according to the decision result in which the built-in scenes include a first scene in connection with a first-scene adjustment rule; and
- if the source image data are associated with the first scene, adjusting the initial white balance gain or processing the source image data according to the first-scene adjustment rule to thereby obtain a scenic white balance gain and adjust the source image data with the scenic white balance gain.

11. A white balance adjusting device with scene detection, comprising:
- a data input interface to receive source image data from an image capture unit in which the source image data include a plurality of sensing units;
- a white balance calculating unit, coupled to the data input interface, to generate an initial white balance gain according to the source image data;
- an image parameter calculating unit, coupled to the data input interface, to generate at least one image parameter corresponding to a plurality of parameter elements according to the source image data, wherein the at least one image parameter includes at least one of a brightness parameter, a chrominance parameter and a texture parameter;
- a decision unit, coupled to the image parameter calculating unit, to determine whether at least one preset condition is satisfied based on the at least one image parameter and accordingly generate a decision result, wherein the decision unit executes at least the following steps:
  - determining whether an element number or a percentage of the parameter elements in compliance with a predetermined color is higher than a predetermined threshold according to the chrominance parameter to thereby generate a chrominance decision result;
  - determining whether an average or weighted brightness value of the parameter elements in compliance with the predetermined color is higher or lower than a predetermined brightness value according to the brightness parameter to thereby generate a brightness decision result; and
  - generating the decision result according to the chrominance decision result and the brightness decision result; and
- a scene determining unit, coupled to the decision unit and the white balance calculating unit, to determine whether the source image data are associated to any of built-in scenes and/or an association between the source image data and the built-in scenes according to the decision result in which the built-in scenes include a first scene in connection with a first-scene adjustment rule,
- wherein if the source image data are associated with the first scene, adjusting the initial white balance gain or processing the source image data according to the first-scene adjustment rule to thereby obtain a scenic white balance gain and adjust the source image data with the scenic white balance gain.

12. The white balance adjusting device with scene detection of claim 11, wherein the scene determining unit is coupled to the data input interface to acquire at least one image capture parameter and accordingly determine whether the source image data are associated to any of the built-in scenes and/or the association according to the image capture parameter and the decision result.

13. The white balance adjusting device with scene detection of claim 11, wherein the number of the parameter elements is 1/K times the number of the sensing units in which the K is a positive multiple of four or a value to the power of four.

14. The white balance adjusting device with scene detection of claim 11, wherein the decision unit further executes at least the following step:
- determining whether a centralization percentage of the parameter elements of the predetermined color lying within a predetermined area is higher than a predetermined percentage to thereby generate the chrominance decision result.

15. A white balance adjusting device with scene detection, comprising:
- a data input interface to receive source image data from an image capture unit in which the source image data include a plurality of sensing units;
- a white balance calculating unit, coupled to the data input interface, to generate an initial white balance gain according to the source image data;
- an image parameter calculating unit, coupled to the data input interface, to generate at least one image parameter corresponding to a plurality of parameter elements according to the source image data, wherein the at least one image parameter includes at least one of a brightness parameter, a chrominance parameter and a texture parameter;
- a decision unit, coupled to the image parameter calculating unit, to determine whether at least one preset condition is satisfied based on the at least one image parameter and accordingly generate a decision result, wherein the decision unit executes at least the following steps:
  - determining whether an element number or a percentage of the parameter elements in compliance with a predetermined color is higher than a predetermined threshold according to the chrominance parameter to thereby generate a chrominance decision result;

determining whether an average or weighted texture value of the parameter elements in compliance with the predetermined color is higher than a predetermined texture value according to the texture parameter to thereby generate a texture decision result; and generating the decision result according to the chrominance decision result and the texture decision result; and a scene determining unit, coupled to the decision unit and the white balance calculating unit, to determine whether the source image data are associated to any of built-in scenes and/or an association between the source image data and the built-in scenes according to the decision result in which the built-in scenes include a first scene in connection with a first-scene adjustment rule, wherein if the source image data are associated with the first scene, adjusting the initial white balance gain or processing the source image data according to the first-scene adjustment rule to thereby obtain a scenic white balance gain and adjust the source image data with the scenic white balance gain.

16. A white balance adjusting device with scene detection, comprising:

a data input interface to receive source image data from an image capture unit in which the source image data include a plurality of sensing units;

a white balance calculating unit, coupled to the data input interface, to generate an initial white balance gain according to the source image data;

an image parameter calculating unit, coupled to the data input interface, to generate at least one image parameter corresponding to a plurality of parameter elements according to the source image data, wherein the at least one image parameter includes at least one of a brightness parameter, a chrominance parameter and a texture parameter;

a decision unit, coupled to the image parameter calculating unit, to determine whether at least one preset condition is satisfied based on the at least one image parameter and accordingly generate a decision result; and, wherein the decision unit executes at least the following steps:

determining whether an element number or a percentage of the parameter elements in compliance with a predetermined color is higher than a predetermined threshold according to the chrominance parameter to thereby generate a chrominance decision result;

determining whether the difference between a first average or weighted brightness value of the parameter elements lying within a first area and a second average or weighted brightness value of the parameter elements lying within a second area is higher than a predetermined brightness difference according to the brightness parameter to thereby generate a brightness difference decision result; and generating the decision result according to the chrominance decision result and the brightness difference decision result; and a scene determining unit, coupled to the decision unit and the white balance calculating unit, to determine whether the source image data are associated to any of built-in scenes and/or an association between the source image data and the built-in scenes according to the decision result in which the built-in scenes include a first scene in connection with a first-scene adjustment rule, wherein if the source image data are associated with the first scene, adjusting the initial white balance gain or processing the source image data according to the first-scene adjustment rule to thereby obtain a scenic white balance gain and adjust the source image data with the scenic white balance gain.

* * * * *